US007005495B2

United States Patent
Konishi et al.

(10) Patent No.: US 7,005,495 B2
(45) Date of Patent: Feb. 28, 2006

(54) POLYCARBONATE DIOL HAVING HIGH PROPORTION OF PRIMARY TERMINAL OH

(75) Inventors: Mitsuo Konishi, Okayama (JP); Tetsuo Masubuchi, Kawasaki (JP); Koshiro Yokota, Kurashiki (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 77 days.

(21) Appl. No.: 10/275,399

(22) PCT Filed: May 24, 2001

(86) PCT No.: PCT/JP01/04373

§ 371 (c)(1),
(2), (4) Date: Nov. 5, 2002

(87) PCT Pub. No.: WO01/90213

PCT Pub. Date: Nov. 29, 2001

(65) Prior Publication Data

US 2003/0176622 A1    Sep. 18, 2003

(30) Foreign Application Priority Data

May 24, 2000  (JP) .............................. 2000-152333
May 26, 2000  (JP) .............................. 2000-156417
Jun. 9, 2000   (JP) .............................. 2000-173419

(51) Int. Cl.
C08G 18/44    (2006.01)
C08G 64/00    (2006.01)
C08G 64/02    (2006.01)
C07C 69/96    (2006.01)
C07C 69/003   (2006.01)

(52) U.S. Cl. .................. 528/85; 528/370; 558/260; 558/265; 558/266

(58) Field of Classification Search ............ 528/85, 528/370; 558/260, 265, 266
See application file for complete search history.

(56) References Cited

U.S. PATENT DOCUMENTS 6,706,932 B1 *  3/2004  Konishi et al. .............. 568/864
6,872,797 B1 *  3/2005  Ueno et al. .................... 528/85

FOREIGN PATENT DOCUMENTS

| EP | 0302712 A2 | 2/1989 |
|---|---|---|
| JP | 4-7327 A | 1/1992 |
| JP | 04031418 | 2/1992 |
| JP | 5-25254 | 2/1993 |
| JP | 05032754 | 2/1993 |
| JP | 10-292037 A | 11/1998 |
| WO | 01/34543 | * 5/2001 |

* cited by examiner

Primary Examiner—Rabon Sergent
(74) Attorney, Agent, or Firm—Birch, Stewart, Kolasch & Birch, LLP

(57) ABSTRACT

Disclosed is a polycarbonate diol having diol monomer units and carbonate monomer units, wherein the amount of at least one diol monomer unit selected from the group consisting of a 1,5-pentanediol unit and a 1,6-hexanediol unit is from 50 to 100% by mole, based on the total molar amount of the diol monomer units, and wherein the ratio of primary hydroxyl groups in all terminal groups of the polycarbonate diol is in a specific range. Also disclosed is a thermoplastic polyurethane obtained by copolymerizing the above-mentioned polycarbonate diol and a polyisocyanate.

3 Claims, No Drawings

POLYCARBONATE DIOL HAVING HIGH PROPORTION OF PRIMARY TERMINAL OH

This application is the national phase under 35 U.S.C. § 371 of PCT International Application No. PCT/JP01/04373 which has an International filing date of May 24, 2001, which designated the United States of America.

BACKGROUND OF THE INVENTION

1. Field of the Invention

The present invention relates to a polycarbonate diol having an extremely high ratio of primary hydroxyl groups in all terminal groups. More particularly, the present invention is concerned with a polycarbonate diol having diol monomer units and carbonate monomer units, wherein the amount of at least one diol monomer unit selected from the group consisting of a 1,5-pentanediol unit and a 1,6-hexanediol unit is from 50 to 100% by mole, based on the total molar amount of the diol monomer units, and wherein the ratio of primary hydroxyl groups in all terminal groups of the polycarbonate diol is in an extremely high, specific range and, therefore, the ratio of secondary terminal hydroxyl groups is extremely low. The present invention is also concerned with a thermoplastic polyurethane obtained by copolymerizing the above-mentioned polycarbonate diol and an organic polyisocyanate.

When the polycarbonate diol of the present invention is used for producing a thermoplastic polyurethane, a polyester elastomer and the like, the desired polymerization reactions can proceed at high rate, as compared to the case of the use of the conventional polycarbonate diol. Further, the thermoplastic polyurethane of the present invention has remarkably excellent properties with respect to strength, elongation, impact resilience and low temperature properties, as compared to the properties of a thermoplastic polyurethane obtained using the conventional polycarbonate diol.

2. Prior Art

A polyurethane and a urethane-, ester- or amide-based thermoplastic elastomer are used in the art. The soft segments of the polyurethane and thermoplastic elastomer are composed of structural units formed from a polyester polyol and/or a polyether polyol, each of which has a hydroxyl group at each of the molecular terminals thereof (for example, U.S. Pat. Nos. 4,362,825 and 4,129,715). A polyester polyol, such as a polyadipate polyol, has poor hydrolysis resistance. Due to the poor hydrolysis resistance, for example, a polyurethane containing, as soft segments, structural units formed from a polyester polyol has a disadvantage in that cracks are likely to occur and mold is likely to grow on the surface of the polyurethane within a relatively short period of time. Therefore, the use of such a polyurethane is considerably limited. On the other hand, a polyurethane containing, as soft segments, structural units formed from a polyether polyol has good hydrolysis resistance. However, the polyurethane has a disadvantage in that it has poor resistance to light and oxidative degradation. The disadvantages of these polyurethanes are, respectively, attributed to the presence of ester groups in the polymer chain and the presence of ether groups in the polymer chain.

A polycarbonate polyol prepared from 1,6-hexanediol is sold as a polyol usable for forming soft segments which have excellent resistance to hydrolysis, light, oxidative degradation, heat and the like. This resistance is due to the fact that carbonate linkages in the polymer chain exhibit extremely high chemical stability.

In recent years, a thermoplastic polyurethane which is produced using, as a soft segment, a copolycarbonate diol prepared from a mixture of 1,6-hexanediol and 1,4-butanediol or 1,5-pentanediol is attracting attention because of its great advantages. (The above-mentioned copolycarbonate diol is disclosed in Examined Japanese Patent Application Publication No. Hei 5-029648 (corresponding to EP 302712 and U.S. Pat. Nos. 4,855,377 and 5,070,173) and Unexamined Japanese Patent Application Laid-Open Specification No. Hei 5-25264; and the above-mentioned thermoplastic polyurethane is disclosed in Unexamined Japanese Patent Application Laid-Open Specification No. Hei 5-51428 and Japanese Patent Publication No. 1985394 (corresponding to EP 302712 and U.S. Pat. Nos. 4,855,377 and 5,070,173).) Specifically, such thermoplastic polyurethane has advantages not only in that it has remarkably excellent properties with respect to flexibility, low temperature properties and elastic recovery, as well as the same excellent properties as mentioned above and as achieved by using, as a soft segment, a polycarbonate diol prepared from 1,6-hexanediol, but also in that the thermoplastic polyurethane can be easily spun to produce a polyurethane fiber.

A polycarbonate diol is produced by effecting a transesterification reaction between a diol monomer having two primary hydroxyl groups and an organic carbonate compound, such as ethylene carbonate, dimethyl carbonate, diethyl carbonate or diphenyl carbonate, in the presence or absence of a transesterification catalyst.

The prior art document disclosing a copolycarbonate diol prepared from a mixture of 1,6-hexanediol and 1,4-butanediol (Unexamined Japanese Patent Application Laid-Open Specification No. Hei 5-25264) describes that an aliphatic polycarbonate diol containing 60 to 90% by mole of recurring units formed from 1,4-butanediol, based on the total molar amount of the diol monomer units, exhibits a stable reactivity in a reaction thereof with a polyisocyanate for forming a polyurethane.

On the other hand, however, in the course of the studies of the present inventors, it was found that an aliphatic polycarbonate diol, obtained by the method of Unexamined Japanese Patent Application Laid-Open Specification No. Hei 5-029648, specifically an aliphatic polycarbonate diol containing 50% by mole or more of a recurring unit selected from the group consisting of a 1,5-pentanediol unit and a 1,6-hexanediol unit, based on the total molar amount of the diol monomer units, has the following problems. When a polyurethane-forming reaction is conducted using such an aliphatic polycarbonate diol, not only does the polymerization reaction rate become low, but also the resultant thermoplastic polyurethane has poor properties with respect to strength, elongation, impact resilience, low temperature properties and the like. Further, when the above-mentioned aliphatic polycarbonate diol is used for the production of a polyester elastomer, the polymerization reaction rate becomes low.

SUMMARY OF THE INVENTION

In this situation, the present inventors have made extensive and intensive studies with a view toward elucidating the reason why a satisfactory polymerization reaction rate cannot be obtained when a conventional polycarbonate diol is used for the production of a polyurethane or a polyester elastomer. As a result, it has unexpectedly been found that a polycarbonate diol contains secondary terminal hydroxyl groups derived from impurity monomers although the amount of these hydroxyl groups is very small, and such secondary terminal hydroxyl groups, even if the amount thereof is very small, cause a lowering of the reactivity of the polycarbonate diol during a polyurethane-forming reaction and a polyester-forming reaction. Further, the present inventors have found that the problems of the prior art can be solved by a polycarbonate diol having diol monomer units and carbonate monomer units, wherein the amount of at least one diol monomer unit selected from the group consisting of a 1,5-pentanediol unit and a 1,6-hexanediol unit is from 50 to 100% by mole, based on the total molar amount of the diol monomer units, and wherein the ratio of primary hydroxyl groups in all terminal groups of the polycarbonate diol is in an extremely high, specific range and, therefore, the ratio of secondary terminal hydroxyl groups is extremely low to an extent which has not ever been achieved. Specifically, the present inventors have found that such a polycarbonate diol having an extremely high ratio of primary terminal hydroxyl groups exhibits high reactivity in a polyurethane-forming reaction and a polyester-forming reaction, thereby achieving high polymerization reaction rate. Also, the present inventors have found that, when such a polycarbonate diol having an extremely high ratio of primary terminal hydroxyl groups is used as a raw material for producing a thermoplastic polyurethane, advantages are achieved not only in that the desired polymerization reactions can proceed at high rate, but also in that the produced thermoplastic polyurethane has remarkably excellent properties with respect to strength, elongation, impact resilience and low temperature properties. The present invention has been completed based on these novel findings.

Accordingly, it is an object of the present invention to provide a polycarbonate diol exhibiting excellent polymerization activity in a reaction for producing a polyurethane and a reaction for producing a polyester elastomer.

It is another object of the present invention to provide a thermoplastic polyurethane obtained by copolymerizing the above-mentioned polycarbonate diol and a polyisocyanate, wherein the thermoplastic polyurethane can be used as various materials having excellent properties with respect to flexibility, heat resistance, low temperature properties, weathering resistance, strength, and molding processability.

The foregoing and other objects, features and advantages of the present invention will be apparent to those skilled in the art from the following detailed description and appended claims.

DETAILED DESCRIPTION OF THE INVENTION

In one aspect of the present invention, there is provided a polycarbonate diol comprising recurring units each independently represented by the following formula (1):

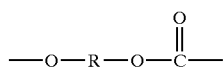

(1)

wherein R represents a divalent aliphatic or alicyclic hydrocarbon group having 2 to 10 carbon atoms, and terminal hydroxyl groups, wherein 50 to 100% by mole of the recurring units of formula (1) are each independently represented by the following formula (2):

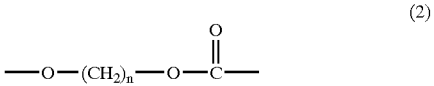

(2)

wherein n is 5 or 6, and wherein:

when the amount of recurring units of formula (2) wherein n=5 is from 50 to 100% by mole, based on the total molar amount of the recurring units of formula (1), the polycarbonate diol has a primary terminal OH ratio of 97% or more, and when the amount of recurring units of formula (2) wherein n=5 is from 0 to less than 50% by mole, based on the total molar amount of the recurring units of formula (1), the polycarbonate diol has a primary terminal OH ratio of 99% or more, the primary terminal OH ratio being defined as the weight percentage of diol monomers having primary hydroxyl groups at both terminals thereof, based on the total weight of the alcohols inclusive of diol monomers, wherein the alcohols, inclusive of diol monomers, are derived from the terminal diol segments of the polycarbonate diol and contained in a fraction obtained by heating the polycarbonate diol at a temperature of from 160 to 200° C. under a pressure of 0.4 kPa or less while stirring.

For easy understanding of the present invention, the essential features and various preferred embodiments of the present invention are enumerated below.

1. A polycarbonate diol comprising recurring units each independently represented by the following formula (1):

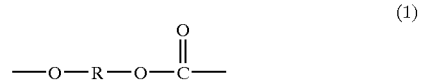

(1)

wherein R represents a divalent aliphatic or alicyclic hydrocarbon group having 2 to 10 carbon atoms, and terminal hydroxyl groups, wherein 50 to 100% by mole of the recurring units of formula (1) are each independently represented by the following formula (2):

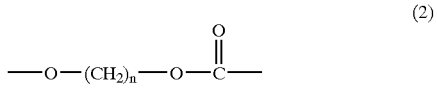

(2)

wherein n is 5 or 6, and wherein:

when the amount of recurring units of formula (2) wherein n=5 is from 50 to 100% by mole, based on the total molar amount of the recurring units of formula (1), the polycarbonate diol has a primary terminal OH ratio of 97% or more, and when the amount of recurring units of formula (2) wherein n=5 is from 0 to less than 50% by mole, based on the total molar amount of the recurring units of formula (1), the polycarbonate diol has a primary terminal OH ratio of 99% or more, the primary terminal OH ratio being defined as the weight percentage of diol monomers having primary hydroxyl groups at both terminals thereof, based on the total weight of the alcohols inclusive of diol monomers, wherein the alcohols, inclusive of diol monomers, are derived from the terminal diol segments of the polycarbonate diol and contained in a fraction obtained by heating the polycarbonate diol at a temperature of from 160 to 200° C. under a pressure of 0.4 kPa or less while stirring.

2. A polycarbonate diol according to item 1 above, wherein, when the polycarbonate diol is decomposed with an alkali to obtain a mixture of diol monomers corresponding to all of the diol segments of the polycarbonate diol, the mixture of diol monomers exhibits:

a primary hydroxyl terminal purity of 99.0% by weight or more when, in the polycarbonate diol, the amount of recurring units of formula (2) wherein n=5 is from 50 to 100% by mole, based on the total molar amount of the recurring units of formula (1), and a primary hydroxyl terminal purity of 99.5% by weight or more when, in the polycarbonate diol, the amount of recurring units of formula (2) wherein n=5 is from 0 to less than 50% by mole, based on the total molar amount of the recurring units of formula (1), the primary hydroxyl terminal purity being defined as the weight percentage of the diol monomers having primary hydroxyl groups at both terminals thereof, based on the weight of the mixture of diol monomers.

3. A thermoplastic polyurethane obtained by copolymerizing the polycarbonate diol of item 1 or 2 above and a polyisocyanate.

Hereinbelow, the present invention will be described in detail.

The polycarbonate diol of the present invention is a polycarbonate diol in which at least one diol monomer unit selected from the group consisting of a 1,5-pentanediol unit and a 1,6-hexanediol unit is present in an amount of 50 to 100% by mole, based on the total molar amount of the diol monomer units, wherein, when the amount of the 1,5-pentanediol units is from 50 to 100% by mole, the polycarbonate diol has a primary terminal OH ratio of 97% or more, preferably 99% or more, and when the amount of the 1,5-pentanediol units is from 0 to less than 50% by mole, the polycarbonate diol has a primary terminal OH ratio of 99% or more, preferably 99.4% or more, more preferably 99.6% or more. As a result of the extensive and intensive studies of the present inventors, it has been found that the above-mentioned polycarbonate diol of the present invention exhibits excellent polymerization activity and high polymerization reaction rate during a polyurethane-forming reaction and hence can be suitably used as a raw material for producing a polyurethane. Further, it has been found that the above-mentioned polycarbonate diol also exhibits excellent polymerization activity and high polymerization reaction rate during a reaction for producing a polyester elastomer.

When the primary terminal OH ratio of the polycarbonate diol is smaller than the above-mentioned range required in the present invention, a problem arises in that, when the polycarbonate diol is reacted with a polyisocyanate in order to produce a thermoplastic polyurethane, the polymerization reaction rate becomes markedly lowered (see Examples 5 to 10 and Comparative Examples 5 to 10, and Examples 11 to 13 and Comparative Examples 11 to 13, which are described below). It is presumed that the reason for the above-mentioned lowering of the polymerization reaction rate resides in that the secondary terminal hydroxyl groups have a steric hindrance, which will lower their reactivity to isocyanate groups. It should be noted that, when a polyurethane-forming reaction between such a polycarbonate diol (which does not satisfy the primary terminal OH ratio requirement of the present invention) and a polyisocyanate is conducted for a long period of time in order to compensate for the lowering of the polymerization reaction rate, the produced thermoplastic polyurethane exhibits poor mechanical properties (that is, a lowering of tensile strength, elongation and impact resilience occurs) (see Examples 5, 7 and 8 and Comparative Examples 11 to 13, which are described below). The reason for the lowering of the mechanical properties of the polyurethane produced is considered to reside in that, due to the presence of polycarbonate diol chains having secondary hydroxyl terminals (which exhibit low reactivity to isocyanate groups), during a long reaction time, the molecular weight distribution (Mw/Mn) of the polyurethane being produced becomes too broad, and also the ratio of low molecular weight polyurethane molecules becomes large.

In the present invention, it is preferred that the primary terminal OH ratio is as high as possible, because the polymerization activity of the polycarbonate diol is increased in accordance with an increase in the primary terminal OH ratio of the polycarbonate diol. For infinitely increasing the primary terminal OH ratio of the polycarbonate diol, it is necessary to infinitely increase the purity of 1,5-pentanediol and/or 1,6-hexanediol, so that too large an amount of labor will be necessary for the purification. However, the excellent effects of the present invention can be obtained as long as the primary terminal OH ratio of the polycarbonate diol is not lower than the lower limit of the above-mentioned range required in the present invention. Therefore, there is no necessity for increasing the primary terminal OH ratio to a level infinitely higher than the lower limit of the above-mentioned range required in the present invention.

The primary terminal OH ratio referred to in the present invention is defined as the weight percentage of diol monomers having primary hydroxyl groups at both terminals thereof, based on the total weight of the alcohols, inclusive of diol monomers, wherein the alcohols, inclusive of diol monomers, are derived from the terminal diol segments of the polycarbonate diol and contained in a fraction obtained by heating the polycarbonate diol at a temperature of from 160 to 200° C. under a pressure of 0.4 kPa or less while stirring.

Specifically, a polycarbonate diol (in an amount of from 70 g to 100 g) is heated at a temperature of from 160 to 200° C. under a pressure of 0.4 kPa or less while stirring to thereby obtain a fraction in an amount which is approximately 1 to 2% by weight of the polycarbonate diol. That is, approximately 1 g (0.7 to 2 g) of a fraction is obtained, and the obtained fraction is recovered using approximately 100 g (95 g to 105 g) of ethanol as a solvent, thereby obtaining a sample solution. The obtained sample solution is analyzed by gas chromatography (GC) to thereby obtain a chromatogram, and the primary terminal OH ratio is calculated from the peak areas in accordance with the following formula:

Primary terminal OH ratio (%)=(sum of the areas of the peaks ascribed to diol monomers having primary hydroxyl groups at both terminals thereof)÷(sum of the areas of the peaks ascribed to the alcohols inclusive of diol monomers (but exclusive of ethanol))×100.

Specific examples of "alcohols inclusive of diol monomers (but exclusive of ethanol)" which are detected by the GC analysis performed for determining the primary terminal OH ratio include 1,4-butanediol, 1,5-pentanediol, 1,6-hexanediol, 1,5-hexanediol, 1,4-cyclohexanediol, 1,4-pentanediol, 1-butanol, 1-pentanol, 1-hexanol and the like. A diol monomer, such as 1,5-pentanediol or 1,6-hexanediol, used for producing the polycarbonate diol of the present invention, is purified by distillation in the production thereof, but an impurity alcohol having a boiling point which is close to that of the diol monomer to be purified will remain in the diol monomer. However, since the boiling point of ethanol is much lower than that of a diol monomer to be purified, even when ethanol is contained in a diol monomer to be purified, ethanol will be removed from the diol monomer by the above-mentioned distillation purification. Therefore, all of ethanol contained in the sample solution which is subjected to GC for determining the primary terminal OH ratio is ascribed to the ethanol used for recovering the fraction.

The primary terminal OH ratio is the ratio of the primary terminal OH groups in all terminal groups of the polycarbonate diol. When a polycarbonate diol is heated under the above-mentioned conditions, namely at a temperature of from 160 to 200° C. under a pressure of 0.4 kPa or less while stirring, only the terminal portions of the polycarbonate diol are decomposed to form diol monomers, and the diol monomers are distilled off and recovered as a fraction. The primary terminal OH ratio is the weight percentage of diol monomers having primary hydroxyl groups at both terminals thereof, based on the total weight of all alcohols. The higher the primary terminal OH ratio, the higher the polymerization activity of the polycarbonate diol during a polyurethane-forming reaction and a polyester-forming reaction.

In the present invention, the lower limit of the primary terminal OH ratio is different depending on whether the amount of recurring units of formula (2) wherein n=5 (that is, 1,5-pentanediol-derived units) is from 50 to 100% by mole or is from 0 to less than 50% by mole. The reason for this is as follows. 1,5-Pentanediol and/or 1,6-hexanediol are/is used as a raw material for producing the polycarbonate diol of the present invention. Among the impurities contained in 1,6-hexanediol, an impurity containing a secondary OH group is 1,4-cyclohexanediol, and both of the two OH groups of 1,4-cyclohexanediol are secondary OH groups. On the other hand, among the impurities contained in 1,5-pentanediol, impurities containing a secondary OH group are 1,5-hexanediol and 1,4-cyclohexanediol. As mentioned above, both of the two OH groups of 1,4-cyclohexanediol are secondary OH groups. However, with respect to 1,5-hexanediol, one of the two OH groups thereof is a secondary OH group, but the other OH group thereof is a primary OH group. Therefore, when the secondary OH group of a 1,5-hexanediol molecule (an impurity) binds to a carbonate compound during the transesterification reaction for producing a polycarbonate diol, there is a possibility that the primary OH group of the 1,5-hexanediol molecule becomes the primary terminal OH group of the final polycarbonate diol. In such case, no problems will be caused by the 1,5-hexanediol molecule. The primary terminal OH ratio is an index for evaluating the ratio of diol monomer units formed from diol monomers having primary OH groups at both terminals thereof in all of the diol monomer units constituting the terminal portions of the polycarbonate diol, and hence the primary terminal OH ratio cannot be increased by the presence of 1,5-hexanediol, which has a primary terminal OH group at only one terminal thereof. Thus, when the amount of 1,5-pentanediol-derived units (1,5-pentanediol monomer units) is from 50 to 100% by mole (that is, when the ratio of 1,5-hexanediol in the impurities contained in the raw materials is high), due to the presence of 1,5-hexanediol, the actual primary terminal OH ratio of the polycarbonate diol is considered to become slightly higher than that determined by the above-mentioned method. Accordingly, when the amount of 1,5-pentanediol-derived units (1,5-pentanediol monomer units) is from 50 to 100% by mole, the lower limit of the primary terminal OH ratio defined in the present invention can be slightly lower than that in the case where the amount of 1,5-pentanediol-derived units (1,5-pentanediol monomer units) is from 0 to less than 50% by mole. Based on this finding, in the present invention, the lower limit of the primary terminal OH ratio is different as between the case where the amount of 1,5-pentanediol-derived units (1,5-pentanediol monomer units) is from 50 to 100% by mole and the case where the amount of 1,5-pentanediol-derived units (1,5-pentanediol monomer units) is from 0 to less than 50% by mole.

As explained above, the primary terminal OH ratio is the ratio of the primary OH groups in all terminal groups of the polycarbonate diol. On the other hand, the composition of all diol segments constituting the polycarbonate diol can also be analyzed. This analysis can be made by a method in which the polycarbonate diol is decomposed with an alkali to obtain a mixture of diol monomers corresponding to all of the diol segments of the polycarbonate diol, and the obtained mixture is analyzed to determine the composition of all diol segments of the polycarbonate diol. Thus, a primary hydroxyl terminal purity can be determined, wherein the primary hydroxyl terminal purity is defined as the weight percentage of the diol monomers having primary hydroxyl groups at both terminals thereof, based on the weight of the mixture of diol monomers. It is preferred that the polycarbonate diol of the present invention exhibits a primary hydroxyl terminal purity of 99.0% by weight or more when the amount of 1,5-pentanediol units in the polycarbonate diol is from 50 to 100% by mole, based on the total molar amount of the diol monomer units. In this case, it is more preferred that the primary hydroxyl terminal purity is 99.2% by weight or more, more advantageously 99.5% by weight or more. On the other hand, it is preferred that the polycarbonate diol of the present invention exhibits a primary hydroxyl terminal purity of 99.5% by weight or more when the amount of 1,5-pentanediol units in the polycarbonate diol is from 0 to less than 50% by mole, based on the total molar amount of the diol monomer units. In this case, it is more preferred that the primary hydroxyl terminal purity is 99.7% by weight or more.

Exemplified below is a specific method in which a polycarbonate diol is decomposed with an alkali to obtain a diol monomer mixture, followed by analysis of the diol composition thereof (that is, followed by determination of a primary hydroxyl terminal purity of the diol monomer mixture obtained by the decomposition of the polycarbonate diol with an alkali). Ethanol and potassium hydroxide are added to a polycarbonate diol and heated for 1 hour in a water bath at 100° C., thereby obtaining a reaction mixture. The obtained reaction mixture is cooled to room temperature and then neutralized using hydrochloric acid. The resultant neutralized solution is analyzed by gas chromatography (GC). It is possible that calculation of a precise weight percentage is difficult, because in some cases not all peaks ascribed to the polycarbonate diol can be identified by the GC analysis. Therefore, in the present invention, "a primary hydroxyl terminal purity of 99.0% by weight or more" means that a value calculated by the following formula, which uses data obtained by the GC analysis, is 99.0 or more: (sum of the areas of peaks ascribed to the diol monomers having primary hydroxyl groups at both terminals thereof)÷(sum of all peak areas exclusive of the areas of the peaks ascribed to the solvent used for diluting a sample and ascribed to the internal standard which is optionally added to the sample) ×100.

Hereinbelow, a method for producing the polycarbonate diol of the present invention is explained. As explained below in detail, the polycarbonate diol can be produced by effecting a transesterification reaction between an organic carbonate compound and at least one diol monomer selected from the group consisting of 1,5-pentanediol and 1,6-hexanediol in the presence or absence of a transesterification catalyst. If desired, additional diol monomer(s) may also be used in addition to the above-mentioned at least one diol monomer.

At present, commercially produced 1,5-pentanediol contains 1,5-hexanediol and 1,4-cyclohexanediol, each in an amount of 0.2 to 1% by weight. These impurities (i.e., 1,5-hexanediol and 1,4-cyclohexanediol) contained in 1,5-pentanediol have secondary hydroxyl groups and hence exhibit only low reactivity during a transesterification reaction for producing a polycarbonate diol. Therefore, when a polycarbonate diol is produced using 1,5-pentanediol as a raw material, the impurities (exhibiting low reactivity) are likely to form the terminal groups of the polycarbonate diol. As a result, the produced polycarbonate diol contains polycarbonate diol chains having secondary hydroxyl groups at the terminals thereof. Such a polycarbonate diol causes a lowering of the polymerization reaction rate of a polyurethane-forming reaction. Also, such a polycarbonate diol adversely affects the rate of a polymerization reaction for producing a polyester elastomer.

The purity of 1,5-pentanediol is preferably not less than 99.0% by weight, more preferably not less than 99.5% by weight. The purity of 1,5-pentanediol can be determined by gas chromatography (GC).

As mentioned above, 1,5-pentanediol is likely to contain impurity diols having a secondary hydroxyl groups. The total amount of diol monomers having secondary hydroxyl groups is preferably less than 0.5% by weight, more preferably less than 0.3% by weight, based on the weight of 1,5-pentanediol. 1,5-Pentanediol may contain other diol monomers having primary hydroxyl groups at both terminals thereof (for example, 1,3-propanediol, 1,4-butanediol, 1,9-nonanediol, 3-methyl-1,5-pentanediol, 1,4-cyclohexanedimethanol). Further, 1,5-pentanediol may contain compounds which cause no adverse effects on the synthesis of the polycarbonate diol, for example, cyclic ethers generated by the dehydration of 1,5-pentanediol. In addition, lactones, such as δ-valerolactone; hydroxycarboxylic acids, such as 5-hydroxyvaleric acid; and monoalcohols, such as pentanol, are likely to be by-produced during the production of 1,5-pentanediol. These compounds may be contained in 1,5-pentanediol, and the total content of these compounds in 1,5-pentanediol is preferably not more than 0.5% by weight, more preferably not more than 0.3% by weight.

1,5-Pentanediol which is suitable for producing the polycarbonate diol of the present invention can be obtained by direct hydrogenation of glutaric acid, using a ruthenium/tin catalyst (i.e., by hydrogenating glutaric acid and/or an ester of glutaric acid with a lower alcohol (having 1 to 6 carbons) in the presence of a ruthenium/tin catalyst); or by hydrogenation of a glutaric acid ester, using a copper/chromium catalyst.

With respect to the form of glutaric acid which can be easily obtained by a commercial process, there can be mentioned a mixture of glutaric acid, succinic acid and adipic acid, wherein the mixture is by-produced during the production of adipic acid by subjecting cyclohexanone and/or cyclohexanol to oxidation with nitric acid. This mixture is subjected to either a direct hydrogenation or an esterification followed by a hydrogenation, to thereby obtain a diol monomer mixture, and the diol monomer mixture is then subjected to purification, for example, by distillation, to thereby obtain 1,5-pentanediol which is suitable for producing the polycarbonate diol.

On the other hand, at present, commercially produced 1,6-hexanediol contains impurities having secondary hydroxyl groups, such as 1,4-cyclohexanediol, wherein the impurities are contained in an amount of from 0.5 to 2% by weight. The impurities contained in 1,6-hexanediol (such as 1,4-cyclohexanediol, which has secondary hydroxyl groups) exhibit only low reactivity during a transesterification reaction for producing a polycarbonate diol. Therefore, when a polycarbonate diol is produced using 1,6-hexanediol as a raw material, the impurities (exhibiting low reactivity) are likely to form the terminal groups of the polycarbonate diol. As a result, the produced polycarbonate diol contains polycarbonate diol chains having secondary hydroxyl groups at the terminals thereof. Such a polycarbonate diol causes a lowering of the polymerization reaction rate of a polyurethane-forming reaction, making it impossible to obtain a polyurethane having a satisfactory molecular weight. Also, such a polycarbonate diol adversely affects the rate of a polymerization reaction for producing a polyester elastomer.

The purity of 1,6-hexanediol is preferably not less than 99.0% by weight, more preferably not less than 99.4% by weight, still more preferably not less than 99.8% by weight. The purity of 1,6-hexanediol can be determined by gas chromatography (GC).

The amount of 1,4-cyclohexanediol in 1,6-hexanediol is preferably 0.5% by weight or less, more preferably 0.1% by weight or less, based on the weight of 1,6-hexanediol. 1,6-Hexanediol may contain other diol monomers having primary hydroxyl groups at both terminals thereof (for example, 1,3-propanediol, 1,4-butanediol, 1,9-nonanediol, 3-methyl-1,5-pentanediol, 1,4-cyclohexanedimethanol). Further, 1,6-hexanediol may contain compounds which cause no adverse effects on the synthesis of the polycarbonate diol, for example, cyclic ethers generated by the dehydration of 1,6-hexanediol. In addition, lactones, such as δ-valerolactone and ε-caprolactone; hydroxycarboxylic acids, such as 5-hydroxyvaleric acid and 6-hydoxycaproic acid; and monoalcohols, such as pentanol and hexanol, are likely to be by-produced during the production of 1,6-hexanediol. These compounds may be contained in 1,6-hexanediol, and the total content of these compounds in 1,6-hexanediol is preferably not more than 0.5% by weight, more preferably not more than 0.3% by weight.

1,6-Hexanediol which is suitable for producing the polycarbonate diol of the present invention can be obtained by direct hydrogenation of adipic acid, using a ruthenium/tin catalyst (i.e., by hydrogenating adipic acid and/or an ester of adipic acid with a lower alcohol (having 1 to 6 carbons) in the presence of a ruthenium/tin catalyst); or by hydrogenation of an adipic acid ester, using a copper/chromium catalyst.

As adipic acid which can be easily obtained by a commercial process, there can be mentioned adipic acid which is obtained by subjecting cyclohexanone and/or cyclohexanol to oxidation with nitric acid in the presence of a catalyst comprising copper and vanadium to thereby form adipic acid, followed by the crystal deposition thereof. The purity of adipic acid is preferably 99.0% by weight or more, more preferably 99.4% by weight or more, and most preferably 99.8% by weight or more. In addition, there can also be used a mixture of glutaric acid, succinic acid and adipic acid, wherein the mixture is by-produced during the production of adipic acid. This mixture is subjected to either a direct hydrogenation or an esterification, followed by hydrogenation, to thereby obtain a diol monomer mixture, and the diol monomer mixture is then subjected to purification, for example, by distillation, to thereby obtain 1,6-hexanediol which is suitable for producing the polycarbonate diol.

Conventionally, 1,6-hexanediol is produced from an organic acid mixture containing adipic acid, hydroxycapronic acid and glutaric acid, wherein the organic acid mixture is by-produced during the production of cyclohexanone and/or cyclohexanol by oxidation of cyclohexane with air. For producing 1,6-hexanediol, the organic acid mixture is subjected to esterification and then to hydrogenation in the presence of a copper catalyst to thereby obtain 1,6-hexanediol, and the obtained 1,6-hexanediol is purified by distillation. 1,6-Hexanediol which is conventionally produced in the above-mentioned manner contains 1,4-cyclohexanediol, and such 1,6-hexanediol is not suitable as a raw material for producing the polycarbonate diol of the present invention. The boiling point of 1,4-cyclohexanediol and the boiling point of 1,6-hexanediol are very close to each other and, therefore, it is difficult to decrease the amount of 1,4-cyclohexanediol in 1,6-hexanediol to the above-mentioned preferred level (i.e., 0.5% by weight or less) by distillation.

By contrast, when 1,6-hexanediol is obtained by a method in which adipic acid is obtained by the oxidation of cyclohexanone and/or cyclohexanol with nitric acid, and the adipic acid is subjected to either a direct hydrogenation or an esterification followed by hydrogenation to thereby obtain 1,6-hexanediol, the obtained 1,6-hexanediol has only a very small content of impurities (such as the above-mentioned diol monomers having secondary OH groups) and hence is suitable as a raw material for producing the polycarbonate diol of the present invention.

Further, if desired, a diol monomer mixture containing a plurality of different types of diol monomers each having primary OH groups at both terminals thereof can be used as a raw material for producing the polycarbonate diol of the present invention. In such case, it is preferred that the so-called primary hydroxyl terminal purity of the diol monomer mixture (which has the same meaning as defined with respect to the mixture of diol monomers obtained by the decomposition of the polycarbonate diol) is 99.0% by weight or more, more preferably 99.5% by weight or more, still more preferably 99.8% by weight or more.

In addition to the at least one diol monomer selected from the group consisting of 1,5-pentanediol and 1,6-hexanediol, if desired, other diol monomers may also be used as a raw material for producing the polycarbonate diol of the present invention. Specific examples of such other diol monomers include 1,3-propanediol, 1,4-butanediol, 1,9-nonanediol, 3-methyl-1,5-pentanediol and 1,4-cyclohexanedimethanol. With respect to the molar ratio of 1,5-pentanediol or 1,6-hexanediol to other diol monomers, there is no particular limitation as long as the total amount of 1,5-pentanediol and 1,6-hexanediol is 50% by mole or more, based on the total molar amount of all diol monomers.

In the present invention, the R groups in 50 to 100% by mole of the recurring units represented by formula (1) above must be comprised of divalent groups derived from at least one diol monomer selected from the group consisting of 1,5-pentanediol and 1,6-hexanediol. Other examples of R groups in the recurring units of formula (1) include divalent groups derived from 1,3-propanediol, 1,4-butanediol, 1,9-nonanediol, 3-methyl-1,5-pentanediol and 1,4-cyclohexanedimethanol.

An especially preferred polycarbonate diol is a copolycarbonate diol synthesized from a mixture of 1,6-hexanediol and at least one diol monomer selected from the group consisting of 1,4-butanediol and 1,5-pentanediol. Such a copolycarbonate diol is preferred because a thermoplastic polyurethane which is prepared using such a copolycarbonate diol exhibits excellent low temperature properties and excellent impact resilience.

If desired, the polycarbonate diol of the present invention may be a multifunctional polycarbonate diol which is synthesized using a mixture of the above-mentioned at least one essential diol monomer (1,5-pentanediol and/or 1,6-hexanediol) and a small amount of a compound having 3 or more hydroxyl groups per molecule, such as trimethylolethane, trimethylolpropane or pentaerythritol, each of which is a polyol having primary hydroxyl groups. When polyols are used in a large amount, the polyols are likely to form cross-linkages and cause gelation. Therefore, it is preferred that the amount of the polyol is not more than 10% by mole, based on the total molar amount of the diol monomers.

The number average molecular weight (Mn) of the polycarbonate diol of the present invention may vary depending on the use of the polycarbonate diol, but it is generally in the range of from 300 to 50,000, preferably from 600 to 20,000. In the present invention, the number average molecular weight of the polycarbonate diol is determined by the following method. The OH value of the polycarbonate diol is determined by the conventional neutralization titration method (JIS K 0070-1992), which uses acetic acid anhydrate, pyridine and an ethanol solution of potassium hydroxide. The number average molecular weight (Mn) is calculated from the OH value in accordance with the following formula:

$$Mn = 56.1 \times 2 \times 1{,}000 \div \text{OH value}$$

As explained above, the polycarbonate diol of the present invention can be produced by effecting a transesterification reaction between an organic carbonate compound and at least one diol monomer selected from the group consisting of 1,5-pentanediol and 1,6-hexanediol in the presence or absence of a transesterification catalyst. If desired, additional diol monomer(s) may also be used in addition to the above-mentioned at least one diol monomer. Examples of organic carbonate compounds include ethylene carbonate, dimethyl carbonate, diethyl carbonate and diphenyl carbonate.

A method for producing a polycarbonate diol without the use of a catalyst is exemplified below, wherein the method uses ethylene carbonate as the organic carbonate compound.

The polycarbonate diol is produced by a method comprising the following two steps. First, a diol monomer and ethylene carbonate are mixed together so that the molar ratio of diol monomer to ethylene carbonate is in the range of from 20:1 to 1:10. The resultant mixture is heated at 100 to 300° C. under atmospheric or reduced pressure to effect a reaction while distilling off the by-produced ethylene glycol and unreacted ethylene carbonate, thereby obtaining a low molecular weight polycarbonate diol having 2 to 10 diol monomer units. Subsequently, the obtained low molecular weight polycarbonate diol is subjected to self-condensation reaction at 100 to 300° C. under reduced pressure while distilling off the unreacted diol monomer and ethylene carbonate. The by-produced diols which are the same as the raw material diol monomers are also distilled off during the self-condensation reaction, thereby obtaining a polycarbonate diol having a desired molecular weight.

Next, a method for producing a polycarbonate diol by using a transesterification catalyst is exemplified below.

Among the conventional, transesterification catalysts, an alkali metal alcoholate is preferred because it can be obtained at a low cost and can be easily removed from the reaction products. An alkali metal alcoholate can be removed, for example, by a reaction thereof with carbon dioxide or by simple washing. Alternatively, an alkali metal alcoholate can be removed either by a treatment with an organic or inorganic acid or by a contact with a sulfonated acidic resin. Examples of other catalysts which can be used for producing the polycarbonate diol of the present invention include transition metal alcoholates (which may be double salts thereof), such as $Ti(OR)_4$, $MgTi(OR)_6$, $Pb(OR)_2$ (wherein R is an organic group), and metal oxides, such as CaO, ZnO and $SnOR_2$ (R is same as defined above), and a combination of these compounds. When, for example, diphenyl carbonate is used as an organic carbonate, an effective amount of the catalyst is from 0.001 to 0.5% by weight, preferably 0.01% by weight, based on the weight of the reaction bulk.

The polymerization reaction is preferably performed in two steps as in the case of the reaction performed without using a catalyst. Specifically, in step 1, a diol monomer and ethylene carbonate are mixed together so that the molar ratio of diol monomer to ethylene carbonate is in the range of from 20:1 to 1:10. The resultant mixture is heated at 100 to 200° C. under atmospheric or reduced pressure to effect a reaction while distilling off the by-produced alcohols derived from the organic carbonate, thereby obtaining a low molecular weight polycarbonate diol. Subsequently, in step 2, the obtained low molecular weight polycarbonate diol is heated at 150 to 300° C. under reduced pressure to effect a self-condensation reaction. The reaction is terminated when the molecular weight of the reaction product has reached a desired value (which can be easily checked by measuring the viscosity of the reaction mixture).

When the polycarbonate diol of the present invention is used for producing a thermoplastic polyurethane or a polyester elastomer, the desired polymerization reactions can proceed at high rate, and therefore the polycarbonate diol can be advantageously used as a raw material for producing a thermoplastic polyurethane and a polyester elastomer, especially for producing a thermoplastic polyurethane.

Accordingly, the thermoplastic polyurethane of the present invention can be obtained by copolymerizing the polycarbonate diol of the present invention and a polyisocyanate.

Examples of polyisocyanates used for producing the thermoplastic polyurethane of the present invention include conventional aromatic diisocyanates, such as 2,4-tolylene diisocyanate, 2,6-tolylene diisocyanate, a mixture of 2,4-tolylene diisocyanate and 2,6-tolylene diisocyanate (TDI), diphenylmethane-4,4'-diisocyanate (MDI), naphthalene-1,5-diisocyanate (NDI), 3,3'-dimethyl-4,4'-biphenylene diisocyanate, crude TDI, poly-methylenepolyphenyl isocyanate, crude MDI, xylylene diisocyanate (XDI) and phenylene diisocyanate; conventional aliphatic diisocyanates, such as 4,4'-methylene-biscyclohexyl diisocyanate (hydrogenated MDI), hexamethylene diisocyanate (HMDI), isophorone diisocyanate (IPDI) and cyclohexane diisocyanate (hydrogenated XDI); and modified products thereof, such as isocyanurate products, carbodimide products and biuret products.

In the present invention, if desired, a chain extender may be used as a copolymerizable component. As the chain extender, there may be employed a customary chain extender used for producing a polyurethane, as described in, for example, "Saishin Poriuretan Oyo-Gijutsu (Latest Application Techniques of Polyurethane)" edited by Keiji Iwata, pp. 25–27, CMC, Japan, 1985. Examples of chain extenders include water, a low molecular weight polyol, a polyamine and the like. Depending on the use of the thermoplastic polyurethane, if desired, a conventional high molecular weight polyol may also be used in combination with the polycarbonate diol of the present invention as long as the properties of the produced polyurethane are not adversely affected. As the conventional high molecular weight polyol, there may be employed those which are described in, for example, pp. 12–23 of "Poriuretan Foumu (Polyurethane Foam)" by Yoshio Imai, published by Kobunshi Kankokai, Japan, 1987. Examples of high molecular weight polyols include a polyester polyol and a polyether carbonate having a polyoxyalkylene chain (i.e., a polyether carbonate polyol).

Specifically, a low molecular weight polyol used as a chain extender is generally a diol monomer having a molecular weight of not more than 300. Examples of such low molecular weight polyols include aliphatic diols, such as ethylene glycol, 1,3-propanediol, 1,4-butanediol, 1,5-pentanediol, 1,6-hexanediol, neopentyl glycol and 1,10-decanediol.

Further examples of low molecular weight polyols used as a chain extender include alicyclic diols, such as 1,1-cyclohexanedimethanol, 1,4-cyclohexanedimethanol and tricyclodecanedimethanol; xylylene glycol, bis(p-hydroxy)diphenyl, bis(p-hydroxyphenyl)propane, 2,2-bis[4-(2-hydroxyethoxy)phenyl]propane, bis[4(2-hydroxy)phenyl]sulfone and 1,1-bis[4-(2-hydroxyethoxy)phenyl]cyclohexane. As a chain extender, ethylene glycol and 1,4-butanediol are preferred.

For producing the thermoplastic polyurethane of the present invention, a urethane-forming technique known in the art may be employed. For example, the polycarbonate diol of the present invention is reacted with an organic polyisocyanate at a temperature of from room temperature to 200° C. to form a thermoplastic polyurethane. When a chain extender is optionally used, a chain extender may be added to the reaction system either before initiating the reaction or during the reaction. For a specific method for producing a thermoplastic polyurethane, reference can be made to U.S. Pat. No. 5,070,173.

In the polyurethane-forming reaction, a conventional polymerization catalyst, such as a tertiary amine and an organic salt of a metal, e.g., tin or titanium, may be employed (see, for example, "Poriuretan Jushi (Polyurethane Resin)" written by Keiji Iwata, pages 23 to 32, published in 1969 by The Nikkan Kogyo Shimbun, Ltd., Japan). The polyurethane-forming reaction may be performed in a solvent. Preferred examples of solvents include dimethylformamide, diethylformamide, dimethylacetamide, dimethylsulfoxide, tetrahydrofuran, methyl isobutyl ketone, dioxane, cyclohexanone, benzene, toluene and ethyl cellosolve.

In the polyurethane-forming reaction, a compound having only one active hydrogen atom which is capable of reacting with an isocyanate group, for example, a monohydric alcohol, such as ethyl alcohol or propyl alcohol, and a secondary amine, such as diethylamine or di-n-propylamine, may be used as a reaction terminator.

In the present invention, it is preferred that stabilizers, such as heat stabilizers (for example, antioxidant) and light stabilizers, are added to the thermoplastic polyurethane.

Examples of antioxidants (heat stabilizers) include aliphatic, aromatic or alkyl-substituted aromatic esters of phosphoric acid or phosphorous acid; hypo-phosphinic acid derivatives; phosphorus-containing compounds, such as phenylphosphonic acid, phenylphosphinic acid, diphenylphosphonic acid, polyphosphonate, dialkylpentaerythritol diphosphite and a dialkylbisphenol A diphosphite; phenol derivatives, especially, hindered phenol compounds; sulfur-containing compounds, such as thioether type compounds, dithioacid salt type compounds, mercaptobenzimidazole type compounds, thiocarbanilide type compounds and thiodipropionic acid esters; and tin-containing compounds, such as tin malate and dibutyltin monooxide.

In general, antioxidants can be classified into primary, secondary and tertiary antioxidants. As hindered phenol compounds used as a primary antioxidant, Irganox 1010 (trade name) (manufactured and sold by CIBA-GEIGY, Switzerland) and Irganox 1520 (trade name) (manufactured and sold by CIBA-GEIGY, Switzerland) are preferred. As phosphorus-containing compounds used as a secondary antioxidant, PEP-36, PEP-24G and HP-10 (each being a trade name) (each manufactured and sold by ASAHI DENKA K.K., Japan) and Irgafos 168 (trade name) (manufactured and sold by CIBA-GEIGY, Switzerland) are preferred. Further, as sulfur-containing compounds used as a tertiary antioxidant, thioether compounds, such as dilaurylthiopropionate (DLTP) and distearylthiopropionate (DSTP) are preferred.

Examples of light stabilizers include UV absorber type light stabilizers and radical scavenger type light stabilizers. Specific examples of UV absorber type light stabilizers include benzotriazole compounds and benzophenone compounds. Specific examples of radical scavenger type light stabilizers include hindered amine compounds.

The above-exemplified stabilizers can be used individually or in combination. The stabilizers are added to the thermoplastic polyurethane in an amount of from 0.01 to 5 parts by weight, preferably from 0.1 to 3 parts by weight, more preferably from 0.2 to 2 parts by weight, relative to 100 parts by weight of the thermoplastic polyurethane.

If desired, a plasticizer may be added to the thermoplastic polyurethane of the present invention. Examples of plasticizers include phthalic esters, such as dioctyl phthalate, dibutyl phthalate, diethyl phthalate, butylbenzyl phthalate, di-2-ethylhexyl phthalate, diisodecyl phthalate, diundecyl phthalate and diisononyl phthalate; phosphoric esters, such as tricresyl phosphate, triethyl phosphate, tributyl phosphate, tri-2-ethylhexyl phosphate, trimethylhexyl phosphate, tris-chloroethyl phosphate and tris-dichloropropyl phosphate; aliphatic esters, such as octyl trimellitate, isodecyl trimellitate, trimellitic esters, dipentaerythritol esters, dioctyl adipate, dimethyl adipate, di-2-ethylhexyl azelate, dioctyl azelate, dioctyl sebacate, di-2-ethylhexyl sebacate and methylacetyl ricinoleate; pyromellitic esters, such as octyl pyromellitate; epoxy plasticizers, such as epoxidized soyabean oil, epoxidized linseed oil and epoxidized fatty acid alkyl ester; polyether plasticizers, such as adipic ether ester and polyether; liquid rubbers, such as liquid NBR, liquid acrylic rubber and liquid polybutadiene; and non-aromatic paraffin oil.

The above-exemplified plasticizers may be used individually or in combination. The amount of the plasticizer added to the thermoplastic polyurethane is appropriately chosen in accordance with the required hardness and properties of the thermoplastic polyurethane; however, in general, it is preferred that the plasticizer is used in an amount of from 0.1 to 50 parts by weight, relative to 100 parts by weight of the thermoplastic polyurethane.

In addition, other additives, such as inorganic fillers, lubricants, colorants, silicon oil, foaming agents, flame retardants and the like, may be added to the thermoplastic polyurethane of the present invention. Examples of inorganic fillers include calcium carbonate, talc, magnesium hydroxide, mica, barium sulfate, silicic acid (white carbon), titanium oxide and carbon black. These additives may be added to the thermoplastic polyurethane of the present invention in an amount which is generally used for the conventional thermoplastic polyurethane.

The Shore D hardness of the thermoplastic polyurethane of the present invention is preferably in the range of from 20 to 70, more preferably from 25 to 50. When the Shore D hardness is less than 20, heat stability and scratch resistance become low. On the other hand, when the Shore D hardness is more than 70, low temperature properties and softness become unsatisfactory.

Further, the melt flow rate (as measured at 230° C. under a load of 2.16 kg; hereinafter, abbreviated to "MFR") of the thermoplastic polyurethane of the present invention is preferably from 0.5 to 100 g/10 minutes, more preferably from 5 to 50 g/10 minutes, still more preferably from 10 to 30 g/10 minutes. When MFR is less than 0.5 g/10 minutes, the injection moldability of the polyurethane becomes poor and the injection molding is likely to result in "short shot" (that is, the filling of the mold cavity becomes incomplete). On the other hand, when MFR is more than 100 g/10 minutes, not only the mechanical properties (such as tensile strength and elongation at break) and abrasion resistance, but also low temperature properties are lowered.

With respect to the molecular weight of the thermoplastic polyurethane, it is preferred that each of the number average molecular weight (Mn) and the weight average molecular weight (Mw) of the thermoplastic polyurethane is in the range of from 10,000 to 200,000. Each of Mn and Mw is measured by GPC analysis, using a calibration curve obtained with respect to standard polystyrene samples.

Hereinbelow, a method for producing a polyester elastomer by using the polycarbonate diol of the present invention is explained. A polyester elastomer can be produced in accordance with the various known methods. For example, the polycarbonate diol of the present invention, a dicarboxylic ester or a combination of a dicarboxylic acid and a chain extender, and an antioxidant are charged into a reactor together with a catalyst (for example, at least one catalyst selected from the group consisting of tetrabutyl titanate, magnesium acetate and calcium acetate), and a reaction is effected at 100 to 250° C. under atmospheric pressure to 0.01 kPa, thereby obtaining a polyester elastomer. With respect to the chain extender and the antioxidant, those which are exemplified above in connection with the thermoplastic polyurethane can be used. The antioxidant has the effect of preventing the discoloration of the polyester elastomer during the production thereof, and it is preferred that the antioxidant is added to the polyester elastomer during the production thereof. The use of a catalyst can decrease the required polymerization time, thereby suppressing the heat deterioration of the polyester elastomer during the production thereof. If desired, a light stabilizer may be added to the produced polyester elastomer. With respect to the light stabilizer, those which are exemplified above in connection with the thermoplastic polyurethane can be used. As an example of a dicarboxylic ester used for producing the polyester elastomer, there can be mentioned dimethyl terephthalate. Representative examples of dicarboxylic acids used for producing the polyester elastomer include 2,6-naphthalene dicarboxylic acid and terephthalic acid.

With respect to the molecular weight of the polyester elastomer, it is preferred that each of the number average molecular weight (Mn) and the weight average molecular weight (Mw) of the polyester elastomer is in the range of from 10,000 to 200,000. Each of Mw and Mn is measured by GPC analysis, using a calibration curve obtained with respect to standard polystyrene samples.

An example of a method for producing a polyester elastomer by reacting the polycarbonate diol of the present invention with a dicarboxylic ester or dicarboxylic acid is as follows. The polycarbonate diol of the present invention is mixed with a dicarboxylic ester or dicarboxylic acid, and optionally added thereto is at least one member selected from the group consisting of a chain extender, an antioxidant, a light stabilizer and a catalyst, and a polymerization reaction is effected by heating the resultant mixture at a predetermined temperature in a nitrogen gas atmosphere under atmospheric pressure while distilling off the by-produced alcohol or water. The pressure of the reaction system is changed to reduced pressure in accordance with an increase in the degree of polymerization of the reaction product, and if desired, the temperature is elevated to distill off the by-produced alcohol or water and a part of the chain extender. When the degree of polymerization of the reaction product has reached a desired value, the pressure of the reaction system is increased to atmospheric pressure in a nitrogen gas atmosphere, and the heating is terminated, followed by cooling of the reaction system to room temperature, thereby terminating the reaction. With respect to the specific methods for producing a polyester elastomer, reference can be made to, for example, French Patent No. 2,253,044 and Unexamined Japanese Patent Application Laid-Open Specification Nos. Sho 50-40657 and Sho 50-45895.

BEST MODE FOR CARRYING OUT THE INVENTION

Hereinbelow, the present invention will be described in more detail with reference to the following Reference Example, Examples and Comparative Examples; however, they should not be construed as limiting the scope of the present invention.

In the following Reference Example, Examples and Comparative Examples, various measurements and analyses were conducted by the following methods.

The primary terminal OH ratio of a polycarbonate diol was measured by the following method. 70 g to 100 g of a polycarbonate diol was weighed out and placed in a 300 cc eggplant shaped flask. Using a rotary evaporator connected to a trap bulb for recovering a fraction, the polycarbonate diol in the eggplant shaped flask was heated in a heating bath at about 180° C. under a pressure of 0.1 kPa or less while stirring to thereby obtain, in the trap bulb, a fraction in an amount which is approximately 1 to 2% by weight of the polycarbonate diol. That is, approximately 1 g (0.7 g to 2 g) of a fraction was obtained, and the obtained fraction was recovered using approximately 100 g (95 g to 105 g) of ethanol as a solvent, thereby obtaining a sample solution. The obtained sample solution was analyzed by gas chromatography (GC) to thereby obtain a chromatogram, and the primary terminal OH ratio was calculated from the peak areas in accordance with the following formula:

Primary terminal OH ratio (%)=(sum of the areas of the peaks ascribed to diol monomers having primary hydroxyl groups at both terminals thereof)÷(sum of the areas of the peaks ascribed to the alcohols inclusive of diol monomers (but exclusive of ethanol))×100.

The analysis by GC was conducted under the following conditions.

Conditions for GC

Column: DB-WAX (column length: 30 m, film thickness: 0.25 $\mu$m) (manufactured and sold by J & W Scientific, U.S.A.)

Heating conditions: the temperature was elevated from 60° C. to 250° C.

Detector: FID (flame ionization detector)

The primary hydroxyl terminal purity of a polycarbonate diol was determined by the following method using an alkali decomposition. Approximately 1.0 g of a polycarbonate diol was weighed out and placed in a 100 cc eggplant shaped flask. 30 g of ethanol and 3.95 g of potassium hydroxide were added to the polycarbonate diol and heated for 1 hour in a heating bath at about 100° C. while stirring, thereby obtaining a reaction mixture. The obtained reaction mixture was cooled to room temperature and then neutralized using hydrochloric acid. The resultant neutralized mixture was chilled in a refrigerator for 1 hour to thereby precipitate potassium chloride formed by neutralization. The precipitated potassium chloride was removed by filtration and the resultant filtrate was analyzed by GC under the same conditions as mentioned above to thereby determine the weight percentage of the diol monomers having primary hydroxyl groups at both terminals thereof, based on the weight of the mixture of diol monomers in the filtrate.

The number average molecular weight (Mn) of the polycarbonate diol was determined by the following method. The OH value of the polycarbonate diol was determined by the conventional neutralization titration method (JIS K 0070-1992), which uses acetic acid anhydrate, pyridine and an ethanol solution of potassium hydroxide. The number average molecular weight (Mn) was calculated from the OH value in accordance with the following formula:

$Mn$=56.1×2×1,000÷OH value.

The number average molecular weight and weight average molecular weight of a thermoplastic polyurethane were determined by GPC (gel permeation chromatography), using a calibration curve obtained with respect to standard polystyrene samples.

In the Examples and the Comparative Examples, various properties of a thermoplastic polyurethane were measured by the following methods.

(1) Shore 'D' Hardness [–]:

Shore 'D' hardness was measured in accordance with ASTM D2240, D type, at 23° C.

(2) Melt Flow Rate (MFR) [g/10 min]:

Melt flow rate was measured in accordance with ASTM D1238, under a load of 2.16 kg at 230° C.

(3) Tensile Strength [kgf/cm$^2$]:

Tensile strength was measured in accordance with JIS K6251 (using a dumbbell No. 3 prescribed therein). A pressed sheet having a thickness of 2 mm was used as a test sample.

(4) Elongation [%]:

Elongation was measured in accordance with JIS K6251 (using a dumbbell No. 3 prescribed therein). A pressed sheet having a thickness of 2 mm was used as a test sample.

(5) Impact Resilience [%]:

Impact resilience was measured in accordance with JIS K6255 (using a Lübke pendulum, 23° C.).

(6) Brittleness Temperature [° C.]:

Brittleness temperature was measured in accordance with JIS K6261. Specifically, the "t100 temperature" determined by the following method using the Gehman torsion test was used as the brittleness temperature. By using a Gehman torsion tester, the torsional modulus of a test specimen (width: 3 mm, length: 38 mm, thickness: 2 mm) was measured at 23±3° C. and at various temperatures which are lower than 23° C., and the ratio of the torsional modulus at each low temperature to the torsional modulus at 23±3° C. (the ratio is hereinafter referred to as the "relative modulus") was calculated in accordance with the following formula:

$$RM = \frac{(180 - \theta_1)}{\theta_1} \bigg/ \frac{(180 - \theta_0)}{\theta_0}$$

wherein,

RM: relative modulus, $\theta_0$: torsion angle of the test specimen at 23±3 C, and $\theta_1$: torsion angle of the test specimen at the low temperature.

The temperature (low temperature) at which RM (relative modulus) calculated by the formula above became 100 was defined as the "t100 temperature", and this temperature was used as the brittleness temperature.

REFERENCE EXAMPLE 1

Synthesis of 1,4-butanediol, 1,5-pentanediol and 1,6-haxanediol

An aqueous solution of a by-produced dicarboxylic acid mixture was obtained from a commercial plant for producing adipic acid, and was heated at about 120° C. for 1 hour and, then, at a temperature of from 170 to 175° C. for 30 minutes while stirring, thereby obtaining a dicarboxylic acid mixture in solid form. The obtained dicarboxylic acid mixture was dissolved in ion-exchanged water to thereby obtain an aqueous dicarboxylic acid mixture solution having a dicarboxylic acid mixture content of 38% by weight. 1,000 g of the dicarboxylic acid mixture solution was contacted with 300 g of a styrene polymer type cation exchange resin (trade name: Amberlite IR-120B) (manufactured and sold by ORGANO CORP., Japan) for 2 hours, followed by removing of the cation exchange resin by filtration. The resultant filtrate (an aqueous dicarboxylic acid mixture solution) was obtained for subsequent use as a raw material for the hydrogenation reaction. The dicarboxylic acid concentration of the filtrate was 38% by weight, and the dicarboxylic acid comprised 20% by weight of succinic acid, 50% by weight of glutaric acid and 30% by weight of adipic acid.

An activated carbon (carrier) was impregnated with chloroplatinic acid hexahydrate, tin(II) chloride and ruthenium trichloride trihydrate, followed by drying of the resultant impregnated activated carbon. Then, the impregnated activated carbon was subjected to reduction treatment in a hydrogen atmosphere to thereby obtain a hydrogenation catalyst. The obtained hydrogenation catalyst comprised an activated carbon having carried thereon 6.0% by weight of ruthenium, 5.0% by weight of tin and 3.5% by weight of platinum. By using the hydrogenation catalyst, the hydrogenation of the above-mentioned dicarboxylic acid mixture was performed in the following manner.

600 g of the above-mentioned aqueous dicarboxylic acid mixture solution and 10 g of the above-mentioned catalyst were charged into a 1,000 ml autoclave made of SUS 316. The atmosphere in the autoclave was purged with nitrogen at room temperature and, then, pressurized hydrogen gas was introduced into the autoclave to increase the internal pressure thereof to 2 MPa, and the internal temperature of the autoclave was elevated to 180° C. After the internal temperature of the autoclave reached 180° C., pressurized hydrogen gas was further introduced into the autoclave to increase the internal pressure thereof to 15 MPa, and then a hydrogenation reaction was performed under the above-mentioned internal pressure for 30 hours. After completion of the hydrogenation reaction, a hydrogenation reaction mixture containing the catalyst was subjected to filtration, to thereby recover the catalyst. The recovered catalyst and 600 g of the above-mentioned aqueous dicarboxylic acid mixture solution were charged into the autoclave, and a hydrogenation reaction was performed under substantially the same conditions as mentioned above. In this way, the procedure for the hydrogenation of the dicarboxylic acid mixture was repeated 9 times in total (i.e., 10 runs of the hydrogenation were performed), thereby obtaining approximately 6 kg of a hydrogenation reaction mixture.

The obtained hydrogenation reaction mixture was heated to 109° C. under atmospheric pressure to distill off a large portion of water contained in the mixture. The residual mixture was subjected to distillation using a multi-stage distillation column having 12 stages. By the distillation, water and low boiling point compounds, such as pentanol, were distilled off, thereby obtaining a purified diol monomer mixture. The purified diol monomer mixture obtained was further subjected to distillation under reduced pressure using a multi-stage distillation column having 35 stages. By the distillation, 1,4-butanediol containing a very small amount of 1,5-pentanediol was recovered as a distillation fraction.

The amount of the recovered 1,4-butanediol was 342 g. The recovered 1,4-butanediol was analyzed by gas chromatography and it was found that the recovered 1,4-butanediol had a purity of 99.1% by weight and contained 0.48% by weight of 1,5-pentanediol as an impurity.

A residual liquid obtained in the column bottom after the distillation recovery of 1,4-butanediol was subjected to distillation under reduced pressure using a multi-stage distillation column having 35 stages. By the distillation, 1,5-pentanediol containing very small amounts of 1,4-butanediol and 1,6-hexanediol was recovered as a distillation fraction.

The amount of the recovered 1,5-pentanediol was 860 g. The recovered 1,5-pentanediol was analyzed by gas chromatography and it was found that the recovered 1,5-pentanediol had a purity of 99.0% by weight and contained 0.09% by weight of 1,4-butanediol, 0.29% by weight of 1,6-hexanediol, not more than 0.01% by weight of 1,5-hexanediol and not more than 0.01% by weight of 1,4-cyclohexanediol as impurities. Other impurities were compounds having boiling points which are higher than that of 1,6-hexanediol, and these other impurities could not be identified. Accordingly, in the obtained diol monomer, which was composed mainly of 1,5-pentanediol, the purity of diol monomers having primary hydroxyl groups at both terminals thereof was 99.38% by weight, and the total content of diol monomers having a secondary hydroxyl group was not more than 0.02% by weight.

A residual liquid obtained in the column bottom after the distillation recovery of 1,5-pentanediol was subjected to distillation under reduced pressure using a multi-stage distillation column having 10 stages. By the distillation, 1,6-hexanediol containing a very small amount of 1,5-pentanediol was recovered as a distillation fraction.

The amount of the recovered 1,6-hexanediol was 476 g. The recovered 1,6-hexanediol was analyzed by gas chromatography and it was found that the recovered 1,6-hexanediol had a purity of 99.1% by weight and contained 0.07% by weight of 1,4-butanediol, 0.43% by weight of 1,5-pentanediol, not more than 0.01% by weight of 1,5-hexanediol and not more than 0.01% by weight of 1,4-cyclohexanediol as impurities. Other impurities were compounds having boiling points which are higher than that of 1,6-hexanediol, and these other impurities could not be identified.

EXAMPLE 1

236 g (2.0 mol) of 1,6-hexanediol synthesized in Reference Example 1 was charged in a reaction vessel equipped with a stirrer, a thermometer and a fractionating column. The 1,6-hexanediol in the reaction vessel was heated at 70° C. to 80° C., and 1.84 g (0.08 mol) of metallic sodium was added thereto while stirring to effect a reaction. After the metallic sodium was completely reacted, 236 g (2.0 mol) of diethyl carbonate was introduced into the reaction vessel, and a reaction was performed under atmospheric pressure while gradually elevating the reaction temperature up to 160° C. When the reaction temperature was elevated to 95° C. to 100° C., ethanol began to be distilled off. The elevation in the reaction temperature from 100° C. up to 160° C. was effected over 6 hours. During this period, a mixture of ethanol and about 10% by weight, based on the weight of the mixture, of diethyl carbonate was distilled off. Then, the pressure within the reaction vessel was lowered to 1.3 kPa or less and a reaction was effected at 200° C. for 4 hours while vigorously stirring and removing distilled ethanol from the reaction vessel. The resultant polymer was cooled, dissolved in dichloromethane and neutralized with diluted acid. The polymer was then dehydrated with anhydrous sodium sulfate. After removing the solvent from the polymer by distillation, the polymer was dried at 140° C. under 0.27 to 0.40 kPa for several hours to obtain a polycarbonate diol. The obtained polycarbonate diol of 1,6-hexanediol was a white solid product at room temperature, and the number average molecular weight thereof was 2,100 and the primary terminal OH ratio thereof was 99.6%. Further, the primary hydroxyl terminal purity thereof, as measured by a method using an alkali decomposition, was 99.7% by weight. Hereinafter, the obtained polymer is referred to as "pc-a".

EXAMPLES 2 AND 3

Aliphatic copolycarbonate diols (referred to as "pc-b" and "pc-c") were individually produced in substantially the same manner as in Example 1 except that 1,4-butanediol (abbreviated to "BDL"), 1,5-petanediol (abbreviated to "PDL") and 1,6-hexanediol (abbreviated to "HDL"), which were synthesized in Reference Example 1, were used in the amounts indicated in Table 1. The properties of the copolycarbonate diols are also shown in Table 1.

EXAMPLE 4

A polycarbonate diol (of 1,5-pentanediol) was produced in substantially the same manner as in Example 1 except that 208 g (2.0 mol) of 1,5-petanediol synthesized in Reference Example 1 was used as a diol monomer. The produced polycarbonate diol of 1,5-pentanediol was a white solid product at room temperature, and the number average molecular weight thereof was 2,000 and the primary terminal OH ratio thereof was 99.2%. Further, the primary hydroxyl terminal purity thereof, as measured by a method using an alkali decomposition, was 99.3% by weight.

COMPARATIVE EXAMPLES 1 TO 3

Aliphatic copolycarbonate diols (referred to as "pc-d", "pc-e" and "pc-f") were individually produced in substantially the same manner as in Example 1 except that commercially available diol products, namely a 1,4-butanediol product (purity determined by analysis: 98.2%), a 1,5-petanediol product (purity determined by analysis: 98.5%) and a 1,6-hexanediol product (purity determined by analysis: 98.6%), were used as diol monomers in the amounts indicated in Table 1. The properties of the copolycarbonate diols are also shown in Table 1.

TABLE 1

|  | Amount of BDL used (g) | Amount of PDL used (g) | Amount of HDL used (g) | Number average molecular weight (Mn) | Primary terminal OH ratio (%) | Primary OH terminal purity as measured by a method using alkali decomposition (wt %) | Abbreviation for polycarbonate diol |
|---|---|---|---|---|---|---|---|
| Ex. 1 | — | — | 236 | 2100 | 99.6 | 99.7 | pc-a |
| Ex. 2 | 91 | — | 118 | 2100 | 99.2 | 99.5 | pc-b |
| Ex. 3 | — | 110 | 118 | 2000 | 99.3 | 99.5 | pc-c |
| Compara. Ex. 1 | — | — | 236 | 2000 | 96.3 | 98.7 | pc-d |
| Compara. Ex. 2 | 91 | — | 118 | 2100 | 96.5 | 98.6 | pc-e |
| Compara. Ex. 3 | — | 110 | 118 | 2000 | 96.0 | 98.3 | pc-f |

Note)
BDL, PDL and HDL mean 1,4-butanediol, 1,5-pentanediol and 1,6-hexanediol, respectively.

COMPARATIVE EXAMPLE 4

A commercially available 1,5-pentanediol product which is different from that mentioned above in Comparative Examples 1 to 3 was purchased and analyzed. The 1,5-pentanediol product had a purity of 98.9% by weight and contained 0.62% by weight of 1,5-hexanediol and 0.27% by weight of 1,4-cyclohexanediol. Further, the 1,5-pentanediol product contained a plurality of unidentified impurities in a total amount of 0.21% by weight. Accordingly, the total content of diol monomers having primary hydroxyl groups at both terminals thereof was 98.9% by weight, and the total content of diol monomers having a secondary hydroxyl group was 0.89% by weight. A polycarbonate diol of 1,5-pentanediol was produced in substantially the same manner as in Example 4 except that the above-mentioned commercially available 1,5-pentanediol product was used as a diol monomer. The produced polycarbonate diol was a white solid product at room temperature, and the number average molecular weight thereof was 1,800. The primary terminal OH ratio thereof was 96.5% and the primary hydroxyl terminal purity thereof, as measured by a method using an alkali decomposition, was 98.9% by weight.

EXAMPLE 5

200 g of pc-a produced in Example 1 and 67.2 g of hexamethylene diisocyanate were charged into a reaction vessel equipped with a stirrer, a thermometer and a refrigeration tube. A reaction of the resultant mixture was performed at 100° C. for 4 hours while stirring, thereby obtaining a urethane prepolymer having terminal NCO groups. To the obtained urethane prepolymer were added 30 g of 1,4-butanediol as a chain extender and 0.006 g of dibutyltin dilaurylate as a catalyst. The resultant mixture was reacted at 140° C. for 60 minutes in a universal laboratory scale extruder (Universal Laboratory Scale Extruder KR-35 type; manufactured and sold by Kasamatsu Plastic Engineering and Research Co., Ltd., Japan) equipped with a kneader, thereby obtaining a thermoplastic polyurethane. The obtained thermoplastic polyurethane was then pelletized using the extruder. The number average molecular weight (Mn) and weight average molecular weight (Mw) of the thermoplastic polyurethane were, respectively, 68,000 and 146,000 as measured by GPC analysis, using a calibration curve obtained with respect to standard polystyrene samples. The mechanical properties of the thermoplastic polyurethane are shown in Table 2.

EXAMPLE 6

A thermoplastic polyurethane was produced in substantially the same manner as in Example 5 except that the amounts of pc-a, hexamethylene diisocyanate and 1,4-butanediol were changed to 200 g, 24.5 g and 4.16 g, respectively. The molecular weights and mechanical properties of the thermoplastic polyurethane are shown in Table 2.

EXAMPLES 7 AND 8

Thermoplastic polyurethanes were produced in substantially the same manner as in Example 5 except that pc-b and pc-c were individually used as a polycarbonate diol. The molecular weights and mechanical properties of the thermoplastic polyurethanes are shown in Table 2.

EXAMPLES 9 AND 10

Thermoplastic polyurethanes were produced in substantially the same manner as in Example 6 except that pc-b and pc-c were individually used as a polycarbonate diol. The molecular weights and mechanical properties of the thermoplastic polyurethanes are shown in Table 2.

TABLE 2

| Properties of polyurethane | Ex. 5 | Ex. 6 | Ex. 7 | Ex. 8 | Ex. 9 | Ex. 10 |
|---|---|---|---|---|---|---|
| Polycarbonate diol | pc-a | pc-a | pc-b | pc-c | pc-b | pc-c |
| Molecular weight | | | | | | |
| number average (Mn) | 6.8 | 6.5 | 6.8 | 7.1 | 6.6 | 6.4 |
| weight average. (Mw) | 14.6 | 14.5 | 14.8 | 15.2 | 14.2 | 14.7 |
| Mechanical properties | | | | | | |
| MFR (g/10 min) | 17 | 19 | 18 | 16 | 19 | 20 |
| Hardness (Shore D) | 48 | 32 | 42 | 41 | 28 | 26 |
| Tensile strength (MPa) | 34 | 26 | 30 | 31 | 25 | 26 |
| Elongation (%) | 660 | 700 | 730 | 760 | 760 | 790 |
| Impact resilience (%) | 38 | 42 | 50 | 52 | 55 | 56 |
| Brittleness temperature, t 100 (° C.) | −28 | −30 | −40 | −42 | −42 | −44 |

COMPARATIVE EXAMPLES 5 TO 7

Thermoplastic polyurethanes were produced in substantially the same manner as in Example 5 except that pc-d, pc-e and pc-f were individually used as a polycarbonate diol. The molecular weights and mechanical properties of the thermoplastic polyurethanes are shown in Table 3.

COMPARATIVE EXAMPLES 8 TO 10

Thermoplastic polyurethanes were produced in substantially the same manner as in Example 6 except that pc-d, pc-e and pc-f were individually used as a polycarbonate diol. The molecular weights and mechanical properties of the thermoplastic polyurethanes are shown in Table 3.

TABLE 3

| Properties of polyurethane | Compara. Ex. 5 | Compara. Ex. 6 | Compara. Ex. 7 | Compara. Ex. 8 | Compara. Ex. 9 | Compara. Ex. 10 |
|---|---|---|---|---|---|---|
| Polycarbonate diol | pc-d | pc-e | pc-f | pc-d | pc-e | pc-f |
| Molecular weight | | | | | | |
| number average (Mn) | 5.7 | 5.5 | 5.7 | 5.6 | 5.3 | 5.6 |
| weight average. (Mw) | 13.2 | 13.0 | 13.4 | 14.2 | 13.2 | 14.1 |
| Mechanical properties | | | | | | |
| MFR (g/10 min) | 22 | 24 | 25 | 24 | 26 | 28 |
| Hardness (Shore D) | 47 | 41 | 40 | 30 | 26 | 26 |
| Tensile strength (MPa) | 24 | 20 | 22 | 18 | 15 | 16 |
| Elongation (%) | 450 | 580 | 620 | 460 | 620 | 640 |
| Impact resilience (%) | 33 | 46 | 48 | 36 | 48 | 50 |
| Brittleness temperature, t 100 (° C.) | −25 | −35 | −38 | −28 | −38 | −40 |

EXAMPLE 11

200 g of pc-a produced in Example 1 and 67.2 g of hexamethylene diisocyanate were charged into a reaction vessel equipped with a stirrer, a thermometer and a refrigeration tube. A reaction of the resultant mixture was performed at 100° C. for 4 hours while stirring, thereby obtaining a urethane prepolymer having terminal NCO groups. To the obtained urethane prepolymer were added 30 g of 1,4-butanediol as a chain extender and 0.006 g of dibutyltin dilaurylate as a catalyst. The resultant mixture was reacted at 140° C. for 180 minutes in a universal laboratory scale extruder (Universal Laboratory Scale Extruder KR-35 type; manufactured and sold by Kasamatsu Plastic Engineering and Research Co., Ltd., Japan) equipped with a kneader, thereby obtaining a thermoplastic polyurethane. The obtained thermoplastic polyurethane was then pelletized using the extruder. The number average molecular weight (Mn) and weight average molecular weight (Mw) of the thermoplastic polyurethane were, respectively, 78,000 and 175,000 as measured by GPC analysis, using a calibration curve obtained with respect to standard polystyrene samples. The mechanical properties of the thermoplastic polyurethane are shown in Table 4.

EXAMPLES 12 AND 13

Thermoplastic polyurethanes were produced in substantially the same manner as in Example 11 except that pc-b and pc-c were individually used as a polycarbonate diol. The molecular weights and mechanical properties of the thermoplastic polyurethanes are shown in Table 4.

COMPARATIVE EXAMPLES 11 TO 13

Thermoplastic polyurethanes were produced in substantially the same manner as in Example 11 except that pc-d, pc-e and pc-f were individually used as a polycarbonate diol. The molecular weights and mechanical properties of the thermoplastic polyurethanes are shown in Table 4.

TABLE 4

| Properties of Polyurethane | Ex. 11 | Ex. 12 | Ex. 13 | Compara. Ex. 11 | Compara. Ex. 12 | Compara. Ex. 13 |
|---|---|---|---|---|---|---|
| Polycarbonate diol | pc-a | pc-b | pc-c | pc-d | pc-e | pc-f |
| Molecular weight | | | | | | |
| number average (Mn) | 7.8 | 7.5 | 7.7 | 6.5 | 6.4 | 6.6 |
| weight average (Mw) | 17.5 | 17.3 | 17.7 | 15.8 | 15.5 | 16.3 |
| Mechanical properties | | | | | | |
| MFR (g/10 min) | 5.4 | 5.5 | 5.7 | 12 | 14 | 14 |
| Hardness (Shore D) | 48 | 42 | 41 | 48 | 42 | 40 |
| Tensile strength (MPa) | 38 | 33 | 35 | 26 | 24 | 25 |
| Elongation (%) | 690 | 750 | 790 | 500 | 620 | 630 |
| Impact resilience (%) | 40 | 52 | 54 | 35 | 46 | 48 |
| Brittleness temperature, t 100 (° C.) | −26 | −41 | −42 | −24 | −34 | −39 |

INDUSTRIAL APPLICABILITY

The polycarbonate diol of the present invention exhibits high polymerization activity in a polyurethane-forming reaction and a polyester-forming reaction. Therefore, when the polycarbonate diol of the present invention is used for producing a thermoplastic polyurethane, a poly ester elastomer and the like, the desired polymerization reactions can proceed at high rate, as compared to the case of the use of the conventional polycarbonate diol. Further, the thermoplastic polyurethane of the present invention has remarkably excellent properties with respect to strength, elongation, impact resilience and low temperature properties and hence can be advantageously used in various application fields, such as the fields of automobile parts, parts for household electric appliances, toys and miscellaneous goods. Since the thermoplastic polyurethane of the present invention exhibits especially improved mechanical strength, the thermoplastic polyurethane can be advantageously used in application fields requiring high durability, such as the fields of industrial parts, e.g., hoses, rollers and boots. The thermoplastic polyurethane is also advantageous for use as a material for interior and exterior parts for an automobile, such as a window mole, a bumper, a skin part for an instrument panel and grips; wrist bands for watches and shoe soles.

The invention claimed is:

1. A polycarbonate diol comprising recurring units each independently represented by the following formula (1):

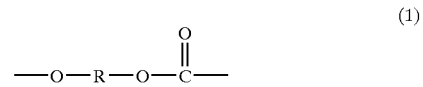

wherein R represents a divalent aliphatic or alicyclic hydrocarbon group having 2 to 10 carbon atoms, and terminal hydroxyl groups,
wherein 50 to 100% by mole of said recurring units of formula (1) are each independently represented by the following formula (2):

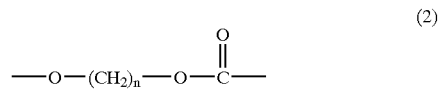

wherein n is 5 or 6, and
wherein:
when the amount of recurring units of formula (2) wherein n=5 is from 50 to 100% by mole, based on the total molar amount of said recurring units of formula (1), said polycarbonate diol has a primary terminal OH ratio of 97% or more, and
when the amount of recurring units of formula (2) wherein n=5 is from 0 to less than 50% by mole, based on the total molar amount of said recurring units of formula (1), said polycarbonate diol has a primary terminal OH ratio of 99% or more,
said primary terminal OH ratio being defined as the weight percentage of diol monomers having primary hydroxyl groups at both terminals thereof, based on the total weight of the alcohols inclusive of diol monomers, wherein said alcohols, inclusive of diol monomers, are derived from the terminal diol segments of said polycarbonate diol and are contained in a fraction obtained by heating said polycarbonate diol at a temperature of from 160 to 200° C. under a pressure of 0.4 kPa or less while stirring.

2. A polycarbonate diol according to claim 1, wherein, when said polycarbonate diol is decomposed with an alkali to obtain a mixture of diol monomers corresponding to all of the diol segments of said polycarbonate diol, said mixture of diol monomers exhibits:
a primary hydroxyl terminal purity of 99.0% by weight or more when, in said polycarbonate diol, the amount of recurring units of formula (2) wherein n=5 is from 50 to 100% by mole, based on the total molar amount of said recurring units of formula (1), and a primary hydroxyl terminal purity of 99.5% by weight or more when, in said polycarbonate diol, the amount of recurring units of formula (2) wherein n=5 is from 0 to less than 50% by mole, based on the total molar amount of said recurring units of formula (1), said primary hydroxyl terminal purity being defined as the weight percentage of the diol monomers having primary hydroxyl groups at both terminals thereof, based on the weight of said mixture of diol monomers.

3. A thermoplastic polyurethane obtained by copolymerizing the polycarbonate diol of claim 1 or 2 and a polyisocyanate.

\* \* \* \* \*